April 5, 1949.  P. BALTENSPERGER  2,466,298
PRESSURE-GAS FILLED CONDENSERS
Filed May 8, 1944
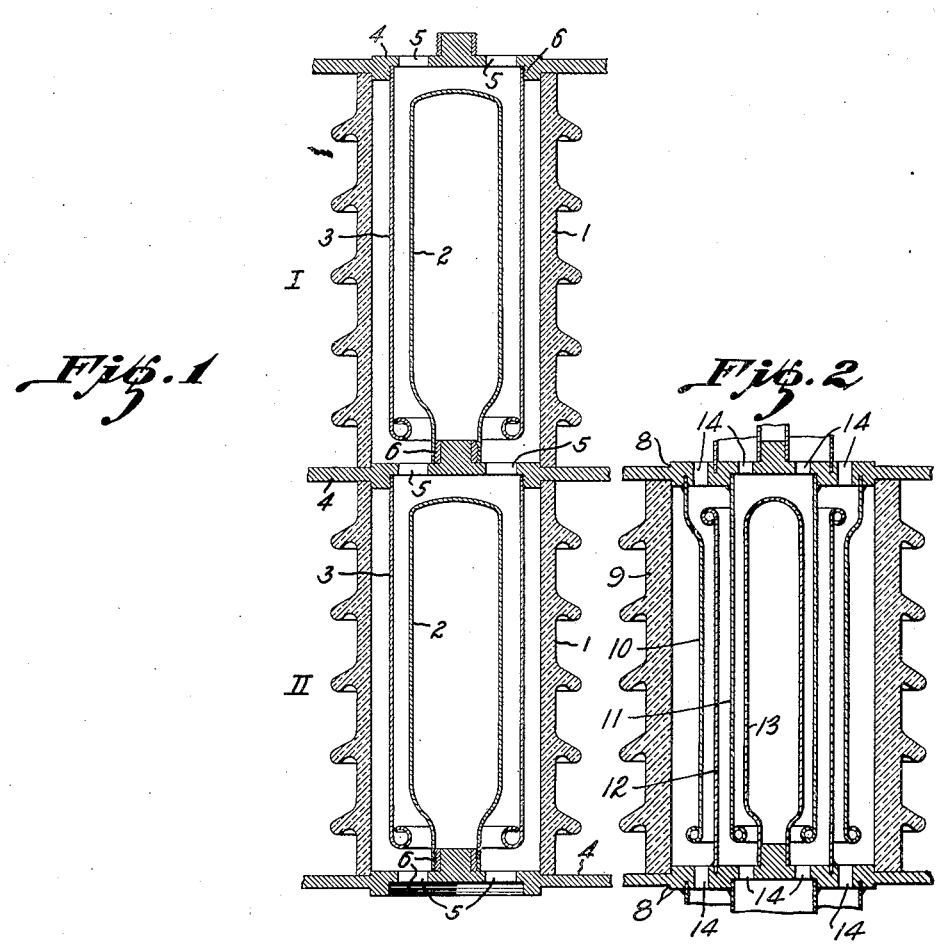
Inventor
Paul Baltensperger,
By Pierce & Scheffler,
Attorneys.

Patented Apr. 5, 1949

2,466,298

UNITED STATES PATENT OFFICE 2,466,298

PRESSURE-GAS FILLED CONDENSERS

Paul Baltensperger, Baden, Switzerland, assignor to Aktiengesellschaft Brown, Boveri & Cie, Baden, Switzerland Application May 8, 1944, Serial No. 534,644
In Switzerland May 31, 1943

6 Claims. (Cl. 175—41.5)

1

The present invention concerns an arrangement for controlling high voltages, particularly in gas blast circuit breakers with multiple interruption, by means of several condenser stages both spatially and electrically connected in series, the condensers being formed by a pressure-gas filled cylindrical insulating casing in which electrodes project freely. Pressure-gas filled condensers of this type have hitherto generally been of a very complicated design and as soon as they are intended to be used for the control of very high voltages the dimensions of the insulating cylinders in which the electrodes have to be housed become so excessive that the condenser cannot be employed in practice.

The purpose of the invention is therefore to produce a pressure-gas filled condenser arrangement which when compared with the arrangements known up to the present is considerably simpler and particularly suitable for continuous operation at a very high voltage. According to the invention this is achieved by providing between neighbouring condenser stages a common connecting element which at the same time carries the electrodes of neighbouring stages and possesses communicating openings for the passage of the pressure gas. Each condenser stage consists of one or more electrode pairs operating as parallel-connected condensers, whereby one electrode of each electrode pair is fixed to the connecting element at one end of the condenser stage whilst the other electrode is connected to the connecting element at the opposite end of the condenser stage.

The invention is explained in greater detail by means of the constructional examples illustrated in the accompanying drawing where a pressure-gas filled condenser is shown in longitudinal section, only two condenser stages I, II adjoining each other in the series being shown, the number of such stages being of course optional.

Referring to Fig. 1, each condenser stage consists of the concentrically arranged metallic electrodes 2, 3 located in a closed cylindrical insulating casing 1. Between each stage there is a plate-shaped connecting element 4 which possesses communicating openings 5 to enable the pressure-gas dielectric to pass freely from one stage to the other. The electrodes 2, 3 which form the electrode pair of one condenser are fixed in such a manner that the electrode 2 is fixed to the connecting element 4 at one end of the condenser stage and the other electrode 3 to the connecting element 4 at the other end of the same stage. Between adjoining condenser

2 stages I, II only one common connecting element 4 is necessary which supports the electrode 2 of stage I and the electrode 3 of the neighbouring stage II. In order to be able to adjust or vary the capacitance of the individual stages, electrodes 2, 3 are fixed to the connecting elements 4 in an adjustable manner, for instance by means of a screw thread 6.

In the constructional example shown in Fig. 1 of the drawing only two electrodes 2, 3 are provided per condenser stage. It is, however, an easy matter to provide several concentrically arranged pairs of electrodes per condenser stage, these electrode pairs acting as parallel connected condensers, whereby one electrode is fixed to one connecting element and the next electrode to the opposite connecting element of the same stage. Thus for instance three consecutive electrodes form two parallel connected condensers, the outer and the middle electrodes forming one condenser and the middle and inner electrode the other condenser. When there are more than two electrodes per stage only the innermost electrode is constructed as a closed cylinder, whilst the remaining concentric electrodes are in the form of open cylinders like the electrodes 3 shown in the drawing.

A typical arrangement for condenser electrodes arranged in concentric pairs is shown in Fig. 2. In this figure, each of the plate members 8 that rest upon the ends of the insulating casing 9 carries a pair of cylindrical electrodes 10 and 11 that extend downwardly from the lower face of the plate member 8 and a pair of cylindrical electrode members 12 and 13 that extend upwardly from the top face of plate 8, it being noted that like the Fig. 1 construction, all of the electrodes are open except the innermost one (electrode 13) so that the compressed gas may pass freely through the apertures 14 to all of the condenser stages.

The condenser arrangement described above is particularly suitable for the potential control of gas-blast circuit breakers with multiple interruption and the blast of compressed air used for extinguishing the circuit breaker arcs is derived from the same source as that which supplies the air to the several stages of the condenser, the arrangement being that compressed air is introduced into the insulating casing 1 at the same time that it is introduced into the circuit breaker as the contacts of the latter are opened. Thus the dielectric strength of the several condenser stages is built up each time that the circuit breaker is opened.

It has been found in practice that even when no compressed air is flowing, i. e. the condition prevailing when the circuit breaker contacts are closed, the moisture from the surrounding air will often penetrate the insulating casing 1 and precipitate on the inside of the casing wall. This undesirable effect which cannot be altogether avoided decreases the resistance of the porcelain to leakage and the resistance to flash-over has to be taken care of solely by the air gap between the inside wall of the insulating casing 1 and the nearest condenser electrode. Since it is therefore necessary that the air gap between electrode and insulator be in itself capable of sustaining the entire voltage stress, it is of advantage to proportion the dimensions of the whole condenser structure such that the distance between the insulating casing 1 and the nearest electrode 3 is at least equal to the shortest distance between two adjacent electrodes. The electrodes are preferably made of rustless metal in order to avoid any deleterious effect from any moisture that may be contained in the air dielectric.

The described arrangement as explained above is particularly suitable for the potential control of gas-blast circuit breakers with multiple interruption. For this purpose each condenser stage is connected over a connecting element in parallel with a corresponding point of interruption of the circuit breaker, so that the desired voltage distribution over all power interrupting points can be obtained. By using pressure gas as a dielectric the condenser can be in continuous operation at high voltages, without any excessive temperature rise occurring. When using this condenser in connection with gas-blast circuit breakers there is also the advantage the pressure gas required for the operation of the circuit breaker can also be used for filling the condenser, so that in this respect no additional expenditure is involved. The condenser can either be kept permanently filled with pressure gas or only during the periods when it is under load.

I claim:

1. Means for distributing high voltages comprising, in combination, a plurality of serially connected condenser stages stacked one above the other; each stage including a cylindrical insulating casing, a pair of coaxial cylindrical electrodes within the casing spaced therefrom and from each other, and a platelike terminal at each end of the casing supporting the outer cylindrical electrode of one stage and the inner cylindrical electrode of the adjacent stage; the casings and terminals providing a housing for retaining a filling of pressure gas and the platelike terminals being apertured to permit passage therethrough of pressure gas.

2. The invention as recited in claim 1, characterized by the feature that each condenser stage comprises a plurality of concentric parallel connected electrode pairs, one electrode of each pair being fixed to the terminal at one end of the casing individual thereto and the other electrode of each pair being fixed to the terminal at the other end thereof.

3. The invention as recited in claim 1, characterized by the feature that the distance between the insulating casing and the adjacent electrode is at least equal to the shortest distance between the electrodes.

4. The invention as recited in claim 1, characterized by the feature that the support for at least one of the electrodes of each condenser stage is comprised of a screw threaded connection to the associated plate to permit relative adjustment thereof in the direction of the longitudinal axis of the insulating casing.

5. The invention as recited in claim 1, characterized by the feature that each condenser stage comprises a plurality of concentric parallel connected electrode pairs, one electrode of each pair being fixed to the terminal at one end of the casing individual thereto and the other electrode of each pair being fixed to the terminal at the other end thereof, the electrode having the smallest diameter being constructed as a closed cylinder and the other electrodes concentric therewith being in the form of open cylinders.

6. The invention as defined in claim 1, characterized by the fact that the inner cylindrical electrode is closed off at both ends to prevent the passage of pressure gas therethrough and the outer cylindrical electrode is open to pressure gas.

PAUL BALTENSPERGER.

REFERENCES CITED

The following references are of record in the file of this patent:

UNITED STATES PATENTS

| Number | Name | Date |
|---|---|---|
| 1,749,967 | Benjamin | Mar. 11, 1930 |
| 1,937,010 | Dubilier | Nov. 28, 1933 |
| 2,210,050 | Usselman | Aug. 6, 1940 |
| 2,344,239 | Finch | Mar. 14, 1944 |

FOREIGN PATENTS

| Number | Country | Date |
|---|---|---|
| 191,322 | Switzerland | Aug. 16, 1937 |
| 435,881 | Great Britain | Oct. 1, 1935 |